United States Patent
Takeda et al.

(10) Patent No.: US 10,841,066 B2
(45) Date of Patent: Nov. 17, 2020

(54) TERMINAL CONFIGURED FOR FEEDBACK TRANSMISSION

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 30 days.

(21) Appl. No.: 15/772,915

(22) PCT Filed: Nov. 2, 2016

(86) PCT No.: PCT/JP2016/082502
§ 371 (c)(1),
(2) Date: May 2, 2018

(87) PCT Pub. No.: WO2017/078033
PCT Pub. Date: May 11, 2017

(65) Prior Publication Data
US 2018/0323938 A1     Nov. 8, 2018

(30) Foreign Application Priority Data
Nov. 5, 2015 (JP) ................................. 2015-217988

(51) Int. Cl.
*H04L 5/00* (2006.01)
*H04L 1/18* (2006.01)
(Continued)

(52) U.S. Cl.
CPC .......... *H04L 5/0055* (2013.01); *H04J 11/00* (2013.01); *H04L 1/16* (2013.01); *H04L 1/1812* (2013.01);
(Continued)

(58) Field of Classification Search
None
See application file for complete search history.

(56) References Cited

U.S. PATENT DOCUMENTS 9,106,419 B2   8/2015   Chen et al.
2012/0087334 A1*  4/2012  Suzuki .................... H04L 5/001
                                                       370/329

(Continued)

OTHER PUBLICATIONS

Extended European Search Report issued in the counterpart European Patent Application No. 16862093.8, dated Jul. 24, 2018 (13 pages).

(Continued)

*Primary Examiner* — Anh Ngoc M Nguyen
(74) *Attorney, Agent, or Firm* — Osha Bergman Watanabe & Burton LLP

(57) ABSTRACT

The present invention is designed so that it is possible to feed back HARQ-ACKs adequately even when a plurality of component carriers are configured in a radio communication system. The present invention provides a receiving section that receives DL signals transmitted from a plurality of component carriers (CCs), and a control section that controls transmission of an HARQ-ACK in response to a received DL signal based on a counter DAI included in the downlink control information, and the counter DAI is configured to three or more bits in predetermined downlink control information. Also, the counter DAI can be comprised of varying numbers of bits depending on the number of CCs configured in the user terminal or the number of CCs where listening is applied to DL transmission.

2 Claims, 13 Drawing Sheets

PUCCH format indicator

| Value of total ARI | PUCCH format3 resource | PUCCH format4/5 resource |
|---|---|---|
| 0 | Resource-A | Resource-W |
| 1 | Resource-B | Resource-X |
| 2 | Resource-C | Resource-Y |
| 3 | Resource-D | Resource-Z |

(51) Int. Cl.
| | |
|---|---|
| H04W 28/04 | (2009.01) |
| H04J 11/00 | (2006.01) |
| H04W 72/04 | (2009.01) |
| H04L 1/16 | (2006.01) |
| H04W 52/54 | (2009.01) |

(52) U.S. Cl.
CPC .......... *H04L 1/1861* (2013.01); *H04W 28/04* (2013.01); *H04W 52/545* (2013.01); *H04W 72/04* (2013.01); *H04L 5/001* (2013.01)

(56) References Cited

U.S. PATENT DOCUMENTS

| | | | | |
|---|---|---|---|---|
| 2013/0114472 | A1* | 5/2013 | Tamaki | H04L 5/001 370/280 |
| 2013/0195065 | A1* | 8/2013 | Park | H04L 5/001 370/329 |
| 2013/0195066 | A1 | 8/2013 | Lee et al. | |
| 2014/0204887 | A1* | 7/2014 | Chung | H04L 1/0046 370/329 |

OTHER PUBLICATIONS

Extended European Search Report issued in the counterpart European Patent Application No. 19157146.2, dated Apr. 24, 2019 (7 pages).
Office Action issued in the counterpart European Patent Application No. 16862093.8, dated Apr. 11, 2019 (7 pages).
Huawei, HiSilicon; "Dynamic adaptation of PUCCH formats for HARQ-ACK feedback"; 3GPP TSG RAN WG1 Meeting #82bis R1-155093; Malmö, Sweden Oct. 5-9, 2015 (6 pages).
Nokia Networks; "Dynamic PUCCH format adaptation"; 3GPP TSG-RAN WG1 Meeting #82bis R1-155582; Malmö, Sweden, Oct. 5-9, 2015 (4 pages).
Office Action issued in the counterpart Japanese Patent Application No. 2017-548785, dated Jul. 31, 2018 (7 pages).
Nokia, Nokia Siemens Networks; "DL control signalling to support extended bandwidth"; 3GPP TSG-RAN WG1 Meeting #56 R1-090722; Athens, Greece, Feb. 9-13, 2009 (9 pages).
CATT; "Resource Allocation for PUCCH Format 3"; 3GPP TSG RAN WG1 Meeting #62bis R1-105153; Xi'an, China, Oct. 11-15, 2010 (5 pages).
LG Electronics; "HARQ-ACK payload adaptation for Rel-13 CA"; 3GPP TSG RAN WG1 Meeting #82bis R1-155376; Malmo, Sweden, Oct. 5-9, 2015 (11 pages).
International Search Report issued in PCT/JP2016/082502 dated Jan. 10, 2017 (2 pages).
Written Opinion of the International Searching Authority issued in PCT/JP2016/082502 dated Jan. 10, 2017 (4 pages).
Huawei et al.; "WF on DAI based solution for dynamic HARQ-ACK codebook"; 3GPP TSG RAN WG1 #82bis, R1-156227; Malmö, Sweden; Oct. 5-9, 2015 (3 pages).
NTT Docomo, Inc.; "WF on dynamic adaptation of HARQ-ACK transmission"; 3GPP TSG RAN WG1 #82bis, R1-156126; Malmo, Sweden; Oct. 5-9, 2015 (5 pages).
Samsung; "Need for DAI and HARQ-ACK Transmission Aspects with CA"; 3GPP TSG RAN WG1 #62, R1-104576; Madrid, Spain; Aug. 23-28, 2010 (4 pages).
Samsung; "DAI transmission for LTE-A TDD"; 3GPP TSG RAN WG1 meeting #59bis, R1-100099; Valencia, Spain; Jan. 18-22, 2010 (4 pages).
LG Electronics; "Way Forward on PUCCH format adaptation for HARQ-ACK"; 3GPP TSG RAN WG1 #82bis, R1-156132; Malmö, Sweden; Oct. 5-9, 2015 (3 pages).
3GPP TS 36.300 V1.0.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2007 (82 pages).
Extended European Search Report issued in counterpart European Patent Application No. 19219830.7, dated Jan. 31, 2020 (7 pages).

* cited by examiner

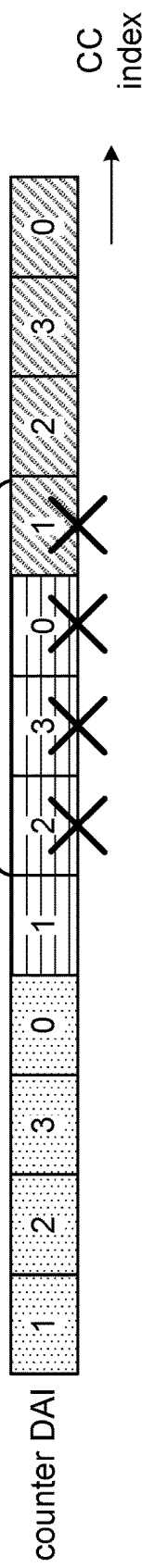
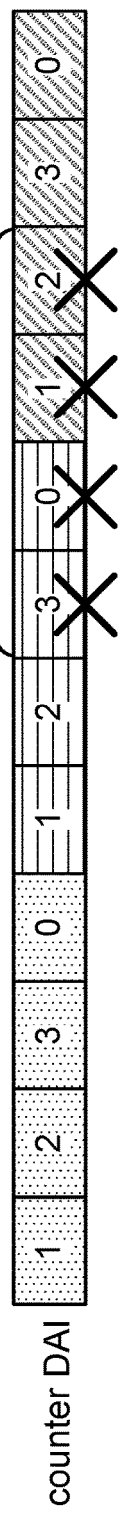
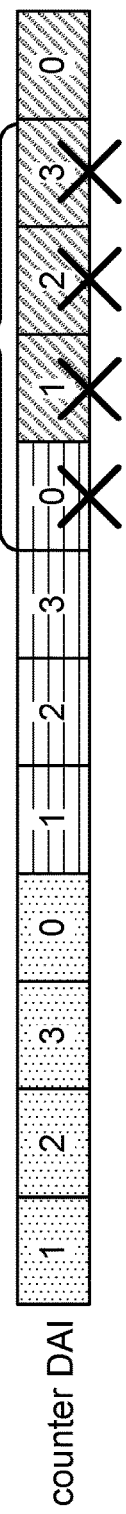
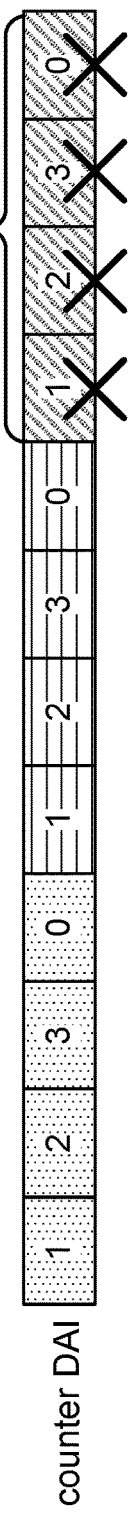

| Number of configured CCs or Number of configured unlicensed CCs | Number of counter DAI bits |
|---|---|
| 5~8 CCs | 3 |
| 9~16 CCs | 4 |
| 17~32 CCs | 5 |

FIG. 4

FIG. 5A
| Value of total ARI | PUCCH format3 resource | PUCCH format4/5 resource |
|---|---|---|
| 0 | Resource-A | Resource-W |
| 1 | Resource-B | Resource-X |
| 2 | Resource-C | Resource-Y |
| 3 | Resource-D | Resource-Z |
FIG. 5B
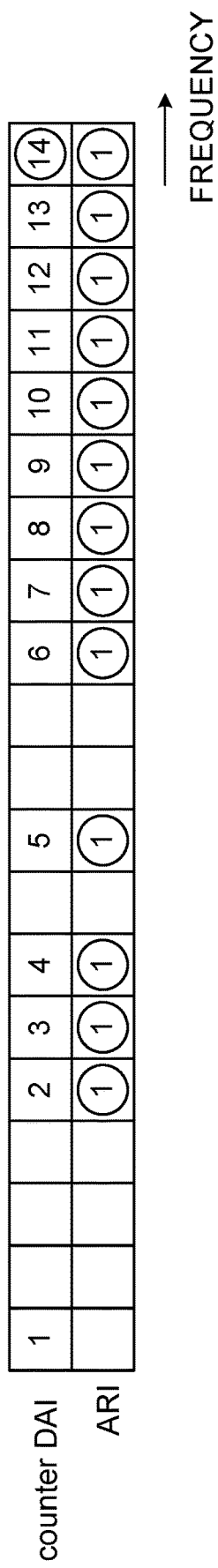
FIG. 5C
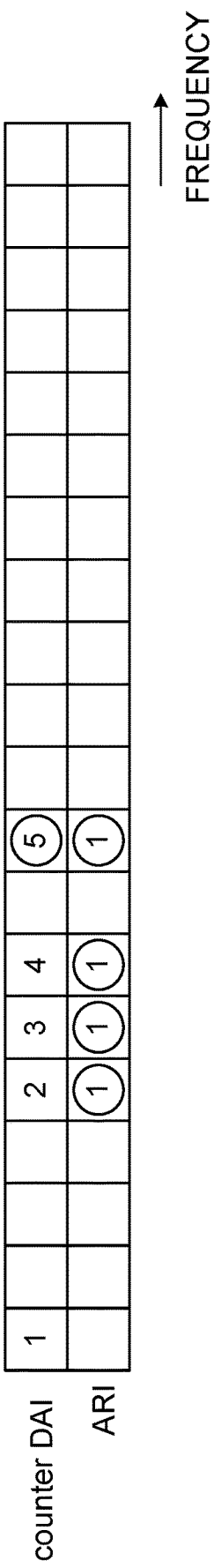

FIG. 7A

| PF indicator | PUCCH format for HARQ-ACK |
|---|---|
| 0 | PUCCH format 3 |
| 1 | PUCCH format 4 or 5 |

FIG. 7B

| | | | | | | | | | | | | | | | |
|---|---|---|---|---|---|---|---|---|---|---|---|---|---|---|---|
| counter DAI | 1 | 2 | 3 | 4 | 5 | | 6 | 7 | 8 | 9 | 10 | 11 | 12 | 13 | 14 |
| ARI | | 1 | 1 | 1 | 1 | | 1 | 1 | 1 | 1 | 1 | 1 | 1 | 1 | 1 |
| PF indicator | 1 | 1 | 1 | 1 | 1 | | 1 | 1 | 1 | 1 | 1 | 1 | 1 | 1 | 1 |

FIG. 7C

| | | | | | | |
|---|---|---|---|---|---|---|
| counter DAI | 1 | 2 | 3 | 4 | 5 | |
| ARI | | 1 | 1 | 1 | 1 | |
| PF indicator | 1 | 1 | 1 | 1 | 1 | |

TERMINAL CONFIGURED FOR FEEDBACK TRANSMISSION

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Also, the specifications of LTE-A (also referred to as LTE-advanced, LTE Rel. 10, 11 or 12) have been drafted for further broadbandization and increased speed beyond LTE (also referred to as LTE Rel. 8 or 9), and successor systems of LTE (also referred to as, for example, FRA (Future Radio Access), 5G (5th generation mobile communication system), LTE Rel. 13 and so on) are under study.

Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as LTE Rel. 8 or 9), and successor systems of LTE (also referred to as, for example, "FRA" (Future Radio Access), "5G" (5th generation mobile communication system), "LTE Rel. 13" and so on) are under study. Carriers that constitute the fundamental units in carrier aggregation are referred to as "component carriers" (CCs), and are equivalent to the system band of LTE Rel. 8.

When CA is used, in a user terminal (UE: User Equipment), a primary cell (PCell: Primary Cell), which is a cell with high reliability to ensure connectivity, and a secondary cell (SCell: Secondary Cell) which is an adjunct cell, are configured.

The UE can first connect to the PCell and add the SCell if necessary. PCell is a single cell (standalone cell) that supports RLM (Radio Link Monitoring), SPS (Semi-Persistent Scheduling), and the like. SCell is a cell that is configured in UE in addition to PCell.

SCell is added and deleted by RRC (Radio Resource Control) signaling. SCell is in a deactivated state immediately after being added to the user terminal, and can only perform communication (scheduling) after being activated.

Also, the specifications of LTE Rel. 8 to 12 have been drafted assuming exclusive operations in frequency bands that are licensed to operators (licensed bands). As licensed bands, for example, the 800 MHz, 2 GHz and/or 1.7 GHz bands are used. Meanwhile, in LTE of Rel. 13 and later versions, operation in frequency bands where license is not required (unlicensed bands) is also a target of study. For unlicensed bands, for example, the 2.4 GHz and/or the 5 GHz band are used as in Wi-Fi (registered trademark).

Although carrier aggregation (LAA: license-assisted access) between licensed bands and unlicensed bands is placed under study in Rel. 13 LTE, there is a possibility that, in the future, dual connectivity (DC) and unlicensed-band stand-alone will becomes targets of study as well.

In LTE Rel. 8 to 12, HARQ (Hybrid Automatic Repeat reQuest) is used for retransmission control. In HARQ, the user terminal (or the radio base station) feeds back the delivery acknowledgment signal (also referred to as HARQ-ACK, ACK/NACK, A/N, etc.) for the data in accordance with the data reception result at a predetermined timing. The radio base station (or user terminal) controls data retransmission based on the feedback HARQ-ACK.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In existing LTE systems of Rel. 12 or earlier versions, the bit size of ACKs/NACKs (also referred to as the "codebook size" and the "bit sequence size") that are fed back by a user terminal is semi-statically determined in advance, based on information reported from a radio base station through higher layer signaling (the number of CCs and so on). Therefore, when applying CA, the user terminal feeds back ACKs/NACKs in a codebook size that is fixedly determined based on the number of CCs and so on.

Therefore, when the number of CCs configured in the user terminal and the number of CCs where DL signals are scheduled in a given subframe are different, the codebook size cannot be changed in the user terminal. This might result in the case where, even when the number of CCs that are actually scheduled is small, the size of ACKs/NACKs to be transmitted is unnecessarily large.

Also, although, in Rel. 12 or earlier versions, the maximum number of CCs that can be configured in CA is 5, the number of configurable CCs is expected to be increased in Rel. 13 and later versions. In this case, if the bit size of ACKs/NACKs is determined in the same way as in existing LTE systems, the number of CCs that are configured and the number of CCs that are scheduled may differ significantly. This may result in increasing the overhead of UL transmission.

Meanwhile, it may be possible to dynamically control the codebook size of HARQ-ACKs to feed back, based on, for example, DL signals received in the user terminal (for example, based on the number of CCs where DL signals are received). However, if the user terminal fails to detect or incorrectly detects the DL signal, the radio base station cannot appropriately receive (for example, decode) the ACK/NACK fed back from the user terminal and the communication quality may be deteriorated.

The present invention has been made in view of the above, and it is therefore an object of the present invention to provide a radio base station, a user terminal and a radio communication method that enable adequate feedback of HARQ-ACKs and that can prevent the decrease of communication quality even when a plurality of component carriers are configured in a radio communication system.

Solution to Problem

A user terminal according to an aspect of the present invention includes a receiving section that receives DL signals transmitted from a plurality of component carriers (CCs), and a control section that controls transmission of an HARQ-ACK in response to a received DL signal based on a counter DAI included in the downlink control information, and the counter DAI is configured to three or more bits in predetermined downlink control information.

Advantageous Effects of Invention

According to an aspect of the present invention, it is possible to feed back HARQ-ACKs adequately and prevent the decrease of communication quality even when a plurality of component carriers are configured in a radio communication system.

BRIEF DESCRIPTION OF DRAWINGS

FIGS. 3A to 3D are diagrams to show an example of the case where the user terminal fails to detect a plurality of CCs consecutively,
and FIG. 3E is a diagram to show an example of the A/N codebook transmitted to the user terminal is there;
FIG. 4 is a diagram to show an example of the number of bits to be configured in the counter DAI in the first example;
FIGS. 5A to 5C are diagrams to explain HARQ-ACK transmission using counter DAI;
FIGS. 7A to 7C are diagrams to show an example of a HARQ-ACK transmission method using a PUCCH format indicator in the third example.

DESCRIPTION OF EMBODIMENTS

Figure 1:
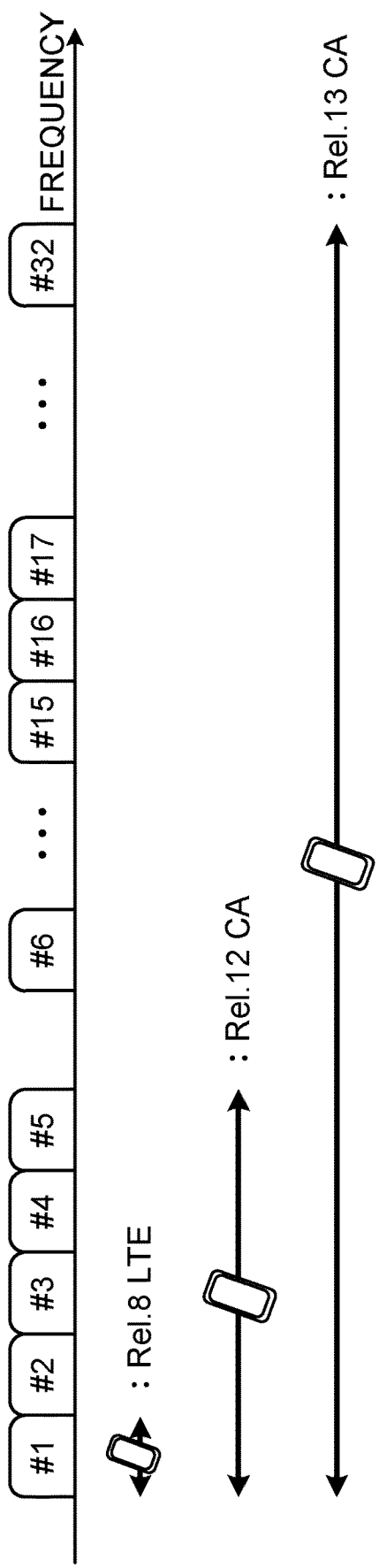
FIG. 1 is a diagram to explain carrier aggregation.

FIG. 1 is a diagram to explain carrier aggregation (CA). As shown in FIG. 1, in CA up to LTE Rel. 12, maximum five component carriers (CCs) (CC #1 to CC #5) are bundled, where the system band of LTE Rel. 8 constitutes one unit. That is, in CA up to LTE Rel. 12, the number of CCs that can be configured per UE is limited to a maximum of five.

Meanwhile, in CA of LTE Rel. 13, a study is in progress to bundle six or more CCs to further expand the bandwidth. That is, in CA of LTE Rel. 13, expansion of the number of CC (cells) configurable per UE to six or more (CA enhancement) is being studied. For example, as shown in FIG. 1, when 32 CCs (CC #1 to CC #32) are bundled, a bandwidth of maximum 640 MHz can be secured.

More flexible and faster radio communication is expected to be made possible by thus reducing the limit on the number of CCs that can be configured per UE. In addition, such expansion of the number of CCs is effective for widening the band by CA (for example, LAA) between the license band and the unlicensed band. For example, when five licensed band CCs (=100 MHz) and fifteen unlicensed band CCs (=300 MHz) are bundled, a bandwidth of 400 MHz can be secured.

In existing systems (LTE Rel. 8 to 12), uplink control information (UCI) is fed back from the UE to the device on the network side (for example, a radio base station (eNB: eNode B)) via the uplink control channel (PUCCH: Physical Uplink Control Channel). At the timing when uplink data transmission is scheduled, the UE may transmit the UCI on the uplink shared channel (PUSCH: Physical Uplink Shared Channel). Based on the received UCI, the radio base station performs data retransmission control, scheduling control, and the like on the UE.

As described above, in the LTE system, retransmission control is supported in wireless communication between a user terminal using a plurality of CCs (cells, carriers) and a radio base station. The user terminal feeds back delivery acknowledgment signals (HARQ-ACK: Hybrid Automatic Repeat reQuest Acknowledgment, also referred to as ACK/NACK: ACKnowledgment/Negative ACKnowledgment, A/N, etc.), to the radio base station, in response to DL transmission transmitted from the radio base station. Here, ACK/NACKs are formed with a bit sequence of a predetermined length, comprised of bits that represent ACKs or NACKs.

Feedback (UCI on PUCCH) to use an uplink control channel (PUCCH) and feedback (UCI on PUSCH) to use uplink shared channel (PUSCH) are defined as methods of feeding back HARQ-ACK. For example, when simultaneous PUCCH-PUSCH transmission is not configured and transmission of UL data is commanded at A/N transmission timing, the user terminal transmits A/Ns using the PUSCH. On the other hand, if there is no uplink user data, the user terminal transmits A/Ns using the PUCCH.

Also, in the LTE system, a plurality of PUCCH formats (PUCCH format, PF, etc.) that the user terminal can use to transmit A/Ns to the radio base station via the uplink control channel are defined. For example, when PUCCH format 1a/1b is configured in the user terminal, the user terminal transmits an ACK/NACK signal in a PUCCH resource that corresponds to a CCE/ECCE (Control Channel Element/Enhanced CCE) index of a control channel (PDCCH/EPDCCH) that schedules the PDSCH, without encoding.

Also, when PUCCH format 3 (PF3) is configured, among the four resources configured by higher layer signaling, the user terminal transmits an A/N using one PUCCH resource specified by ARI (Ack/nack Resource Indicator). In this case, the user terminal can read the TPC (Transmit Power Control) field (TPC command bit) included in the downlink control information of SCell as an ARI.

As a new PUCCH format, introduction of PUCCH format 4 (PF 4) or PUCCH format 5 (PF 5) with larger capacity than PUCCH format 3 is being studied. PUCCH format 4 does not support code multiplexing (CDM), but PUCCH format 4 can be assigned to one or more PRBs (multiple PRBs). It is also studied to configure PUCCH format 4 so that one demodulation reference signal (DMRS) is provided in each slot. That is, PUCCH format 4 can have a PUSCH-like configuration. Also, PUCCH format 5 supports code multiplexing (CDM) and can be assigned to 1 PRB, and a study is in progress to configure PUCCH format 5 so that one demodulation reference signal (DMRS) is provided in each slot.

The radio base station can configure the same ARI value between PDCCHs/EPDCCHs scheduling different SCells' PDSCHs, and transmit them to the user terminal. In PUCCH format 3, when FDD (Frequency Division Duplex) is used, a codebook size of maximum 10 bits is configured, and, when TDD (Time Division Duplex) is used, a codebook size of maximum 21 bits is configured, and these are used for ACKs/NACKs.

In existing systems (LTE Rel. 10 to 12), as mentioned earlier, the codebook size of HARQ-ACKs (ACK/NACK bit sequence) to be transmitted on the PUCCH is determined semi-statically based on information reported by higher layer signaling.

In the case of using FDD, the overall A/N bit size is determined based on the number of CCs configured by RRC signaling and the TM (Transmission Mode), which indicates whether MIMO (Multiple Input Multiple Output) is applicable in each CC. In a certain DL subframe, if a DL assignment is detected in at least one SCell, the user terminal feeds back A/Ns in all the CCs configured in the UL subframe after a predetermined period (for example, 4 ms).

When TDD is used, in addition to the above case using FDD, the overall size of the A/N bit sequence transmitted on the PUCCH is determined based on the number of DL subframes addressed by A/Ns per UL subframe. When the user terminal using TDD detects at least one DL assignment in the bundling window, the user terminal feeds back A/Ns for all the configured CCs using the PUCCH in the UL subframe after a predetermined period (for example, (n+k) ms). That is, the user terminal transmits the ACK/NACK bit sequence, based on higher layer signaling, irrespective of the number of CCs to be scheduled and the number of subframes included in the scheduling information.

In this way, when the bit size of ACKs/NACKs to be fed back is determined based on information reported by higher layer signaling, the situation might arise where the ACK/NACK bit size does not match the number of CCs actually scheduled in the user terminal. Consequently, when A/N feedback of existing systems is used, even when the ACK/NACK codebook size to match the CCs that are actually scheduled (CCs where DL signals are transmitted) is different from the codebook size reported by higher layer signaling, the user terminal still cannot change the codebook size.

On the other hand, as described above, in LTE Rel. 13 or later versions, a study is in progress to configure 6 or more CCs (more than 5 CCs, and maximum 32 CCs, for example). When the number of CCs to be configured is expanded, it is possible that the gap between the number of CCs configured and the number of CCs scheduled in each subframe increases. If the number of CCs where DL signals are scheduled is less than the number of CCs to be configured and the codebook size is determined semi-statically as in conventional cases, this leads to the situation where most of the ACKs/NACKs transmitted from the user terminal are NACKs.

In general, the smaller the A/N codebook size, the smaller the amount of information that the user terminal transmits. Therefore, if the A/N codebook size can be reduced, the quality of communication (SINR: Signal to Interference plus Noise Power Ratio) required in radio transmission can be kept low. For example, in CA using five CCs at a maximum, the SINR required in ACK/NACK transmission can be kept low by decreasing the A/N codebook size fed back by the user terminal according to the CCs that are scheduled.

By performing transmission power control so as to increase the transmission power according to the codebook size, the transmission power can be controlled to satisfy the required SINR regardless of the codebook size. However, even in this case, by reducing the codebook size of A/Ns fed back from the user terminal according to the number of scheduled CCs, the transmission power required for A/N transmission can be kept low.

Therefore, it is effective to make it possible to dynamically change the codebook size of A/Ns (HARQ-ACKs) that the user terminal feeds back, according to the number of CCs that are scheduled. In the case where the codebook size of A/Ns to be fed back from the user terminal can be changed dynamically, for example, the user terminal may change the number of ACK/NACK bits dynamically depending on the number of scheduled CCs and so on.

In TDD of existing LTE systems, DL assignment indices (DAI: Downlink Assignment Indicator (Index)) indicating the allocation (scheduling) of DL signals in the subframe direction (time direction) are supported. The DL DAI indicating the accumulative number (count value) of subframes scheduled in the bundling window used in TDD is included in the DL assignment of each subframe and reported from the radio base station to the user terminal. Also, the UL DAI indicating the total number of subframes scheduled in the bundling window is included in the UL grant and reported from the radio base station to the user terminal.

Normally, the probability that a user terminal fails to detect more than four DL assignments consecutively is low, and so the DAI is defined by 2 bits, and bit information to which modulo 4 is applied is reported as the cumulative number of DL DAI. For example, if the number of subframes to be scheduled is continuous seven times (DL DAI is 1 to 7), the radio base station reports DL DAI (1→2→3→0→1→2→3) using four types of bit information.

Therefore, in Rel. 13 and later CA (enhanced CA), not only the cumulative number of DL DAI in the subframe direction but also the cumulative number of DL DAI in the direction of CCs can be reported (also referred to as counter DAI), so that scheduling CCs can be reported to the user terminal. In this case, even when FDD is applied, it is possible to include DAI in the downlink control information of each CC scheduled in a certain subframe, and report this to the user terminal (see FIG. 2).

Figure 2:
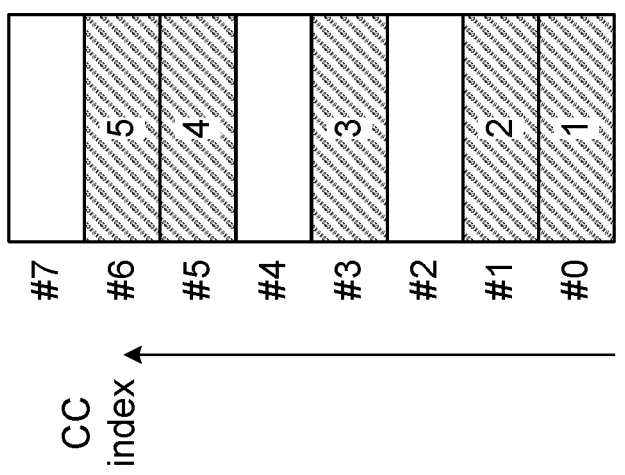
FIG. 2 is a diagram to show an example of the case where the counter DAI is configured in the CC direction.

FIG. 2 assumes a case where, while eight CCs are configured in a user terminal (CC #0 to #7), only a part of the CCs (CC #0, #1, #3, #5, #6) are scheduled in a certain subframe. In this case, the radio base station includes counter DAIS (here, counter DAI values=1 to 5) in each of the DL assignments of the scheduled CCs (CC #0, #1, #3, #5 and #6) and reports the DL assignments to the user terminal. Also, the user terminal may determine the HARQ-ACK codebook size based on detected counter DAI values (for example, the maximum counter DAI value).

As shown in FIG. 2, even when reporting cumulative numbers in the direction of CCs using DAIS, like in existing TDD, the DAIS can be specified with 2 bits, and modulo operation can be applied. In this case, unless the user terminal fails to detect DL signals of four CCs having consecutive count values at the same time, it is possible to correctly judge the cumulative values.

However, in future wireless communication systems, a study is in progress to support CC using unlicensed bands. In particular, when CA to include a large number of CCs is applied, there is a high possibility that unlicensed band CCs are used.

As mentioned earlier, in systems that run LTE/LTE-A in unlicensed bands (for example, LAA systems), interference control functionality is likely to be necessary in order to allow co-presence with other operators' LTE, Wi-Fi, or other different systems. Generally speaking, when a transmission point (for example, a radio base station (eNB), a user terminal (UE) and so on) that communicates by using a carrier (which may also be referred to as a "carrier frequency," or simply a "frequency") of an unlicensed band detects another entity (for example, another user terminal) that is communicating in this unlicensed band carrier, the transmission point is disallowed to make transmission in this carrier.

Therefore, the transmission point executes listening (also referred to as LBT, CCA, carrier sensing, etc.) at a timing a predetermined period before the timing of transmission. To be more specific, by executing LBT, the transmission point searches the whole of the target carrier band (for example, one component carrier (CC)) at a timing that is a predetermined period ahead of a transmission timing, and checks whether or not other devices (for example, radio base stations, user terminals, Wi-Fi devices and so on) are communicating in this carrier band.

The transmission point then carries out transmission using this carrier only if it is confirmed that no other devices are communicating. If the received power measured during LBT (the received power during the LBT period) is equal to or lower than a predetermined threshold, the transmission point judges that the channel is in the idle state (LBT idle), and carries out transmission.

On the other hand, if only just a portion of the target carrier band is detected to be used by another device, the transmission point stops its transmission. For example, if the transmission point detects that the received power of a signal from another device entering this band exceeds a threshold, the transmission point judges the channel is in the busy state (LBT_busy), and makes no transmission. In the event LBT_busy is yielded, LBT is carried out again with respect to this channel, and the channel becomes available for use only after it is confirmed that the channel is in the idle state.

Thus, in unlicensed band CCs, the radio base station performs listening (LBT) before DL transmission, and, if the radio base station detects external interference (LBT_busy), the radio base station cannot perform scheduling for a predetermined period. Therefore, in future communication systems, considering that detection failures of DL assignments occur in the user terminal and that transmission is restricted by LBT_busy in the radio base station, there is a possibility that the possibility of failing to continue detecting DL assignments of four or more CCs may be higher than before.

For example, assume the case where, when modulo operation (for example, modulo 4) is applied, detection of four or more DL assignments fails continuously. In this case, since the recognition of the HARQ-ACK codebook does not match between the radio base station and the user terminal, an ACK-to-NACK error (in which ACK is mistaken for NACK) and a NACK-to-ACK error (in which NACK is mistaken for ACK) occur, and the throughput deteriorates.

In the example shown in FIG. 3, twelve CCs are scheduled in a certain subframe, and the counter DAI to which the modulo operation is applied is included in the DL assignment of each CC and reported to the user terminal.

FIG. 3A shows a case where the user terminal fails to detect four consecutive times from the CC where the counter DAI is 2. Usually, if the number of CCs that fail to be detected in a row is three or less, the user terminal can recognize the detection failures based on the counter DAIs. However, if four or more CCs fail to be detected in a row, the user terminal cannot notice the detection failures. In this case, the codebook size of ACKs/NACKs transmitted from the user terminal (see FIG. 3E) may be different from the codebook size assumed by the radio base station.

FIG. 3B shows a case where the user terminal fails detection four times in succession from the CC where the counter DAI is 3, FIG. 3C shows a case where the user terminal fails to detect four consecutive times from the CC where the counter DAI is 0, and FIG. 3D shows a case where the user terminal fails to detect four consecutive times from the CC where the counter DAI is 1. In this case, the user terminal also transmits the HARQ-ACK using the same codebook size as in FIG. 3A (see FIG. 3E) also in FIGS. 3B to 3D. Therefore, if four or more CCs fail to be detected in a row, there is a possibility that the recognition of the HARQ-ACK codebook size may not match between the radio base station and the user terminal.

Therefore, in CA (for example, Rel. 13 CA) in which the number of CCs is expanded, the present inventors have conceived of configuring the number of counter DAI bits included in predetermined downlink control information (for example, DL assignment) larger than 2. For example, it is possible to configure the number of counter DAI bits to a value (for example, 5 bits) at which the probability of continuing to fail to receive DL assignments is reduced sufficiently.

For example, when the counter DAI is specified by five bits, it is possible to associate different bit values (bit information) with 32 CCs. As a result, even when pluralities of CCs continuously fail to be detected, the user terminal can recognize the detection failure. As a result, the user terminal can appropriately determine the HARQ-ACK codebook size based on the counter DAI, and perform A/N transmission.

Furthermore, the inventors of the present invention focused on the fact that the number of bits required for the counter DAI varies according to the number of CCs, and the present inventors conceived to configure (switch) the number of counter DAI bits based on predetermined conditions (for example, the number of CCs to be configured, the number of unlicensed band CCs, etc.).

Now, embodiments of the present invention will be described below.

Also, the number and arrangement of cells to be scheduled, the indices of cells to be scheduled, and the signals to be transmitted are not limited to those in the following examples.

First Example

In the first example, the case where the number of counter DAI bits included in a predetermined DL assignment is configured to a predetermined value (for example, 3 bits) or more will be described. Also, the case where the number of counter DAI bits is configured to different values based on predetermined conditions will be described.

In the present embodiment, depending on the number of CCs configured in the user terminal or the number of unlicensed band CCs configured in the user terminal, the number of counter DAI bits can be made different. For example, as shown in FIG. 4, when the number of CCs to be configured is 5 to 8, the number of counter DAI bits in DL assignments transmitted in the CCs can be configured to three. In addition, when the number of CCs to be configured is 9 to 16, the number of counter DAI bits can be 4 bits, and when the number of CCs to be configured is 17 to 32, the number of counter DAI bits can be configured to 5.

The number of CCs may be the number of licensed band CCs and unlicensed band CCs combined (the total number of CCs configured for the user terminal), or the number of CCs may be the number of unlicensed band CCs alone. The user terminal can judge whether a configured CC is a licensed band CC or an unlicensed band CC based on the broadcast information of the CC or the like. Alternatively, based on higher layer signaling and CC index (band index) individually configured for each user terminal, the user terminal may distinguish licensed band CCs from unlicensed band CCs.

As shown in FIG. 4, since the counter DAI is configured according to the number of CCs, it is possible to obtain a configuration in which modulo operation is not applied to the counter DAI included in the DL assignment of each CC (in the same subframe or same bundling window, the same counter DAI values are not assigned to DL assignments of different CCs). This makes it possible to solve the inconsistency of recognition caused by modulo operation, and the number of DAI bits can be appropriately configured according to the number of CCs configured for each user terminal and the configuration of CA. As a result, an increase in overhead caused by counter DAIs can be suppressed.

Also, it is possible to control the number of counter DAI bits included in DL assignments based on the type of DL assignments (type of CCs scheduled by DL assignments). For example, depending on whether a certain DL assignment is a PDSCH-scheduling DL assignment of a licensed band CC or a PDSCH-scheduling DL assignment of an unlicensed band CC, counter DAIs with different numbers of bits can be applied.

As an example, it is assumed that the counter DAI included in a DL assignment for scheduling the downlink shared channel (for example, PDSCH) of a licensed band CC is two bits. On the other hand, the counter DAI included in a DL assignment for scheduling the downlink shared channel of an unlicensed band CC can be made 3 bits to 5 bits, depending on the number of unlicensed bands CC to be configured. In this way, the number of counter DAI bits of unlicensed band CCs where detection failure is more likely to occur is selectively increased, o that it is possible to suppress the inconsistency in the recognition of the codebook size between the radio base station and the user terminal and to suppress the increase of overhead caused by counter DAIs.

Alternatively, based on the type of CC to which the DL assignment is transmitted (received), it is possible to suppress the number of counter DAI bits included in DL assignments. For example, depending on whether a DL assignment is transmitted (received) in a licensed band CC or transmitted (received) in an unlicensed band CC, the number of counter DAI bits can be configured differently.

For example, assume the case where the DL assignment of each CC is transmitted (received) in the subject CC (self-scheduling). In this case, the counter DAI of the PDSCH-scheduling DL assignment of a licensed band CC can be configured to 2 bits, and the counter DAI of the PDSCH-scheduling DL assignment of an unlicensed band CC can be configured to 3 bits to 5 bits. On the other hand, when all the DL assignments are transmitted (received) in a licensed band CC by cross-carrier scheduling, the number of counter DAI bits can be configured to 2 bits.

The number of counter DAI bits included in DL assignments is controlled based on the type of CC to which the DL assignment is transmitted, so that the number of counter DAI bits can be appropriately configured according to the scheduling method (for example, cross-carrier scheduling).

Second Example

If counter DAIs with different numbers of bits are configured for multiple DL assignments, if the user terminal receives multiple DL assignments, there is a possibility that the user terminal receives counter DAIs with varying numbers of bits (including 0). In such a case, how to interpret the DAIs and control HARQ-ACK feedback etc. by the user terminal becomes a problem.

For example, counter DAIs are not supported in FDD of existing system (Rel. 12 or earlier). Therefore, even in FDD of Rel. 13, it is assumed that a configuration in which the counter DAI is not included in the DL assignment received in the common search space is used. Similarly, it is assumed that UL DAI is not included in the UL grant received by the user terminal in the common search space. Here, the common search space is an area received by all the user terminals among the areas configured in the downlink control channel, and is an area where all the user terminals attempt decoding processing.

On the other hand, in TDD of existing systems (Rel. 12 or earlier), 2-bit counter DAI and UL DAI are supported. Therefore, in Rel. 13 TDD, at least it may be possible that the DL assignment transmitted in the common search space is configured to include a 2-bit counter DAI. Similarly, there is a high possibility that the UL DAI included in the UL grant received by the user terminal in the common search space is still 2 bits.

It is also assumed that the counter DAI included in the UE-specific DL assignment is configured with a different number of bits, as shown in the first example, depending on the number of CCs and the type of DL assignment. In a second example, an HARQ-ACK feedback control method used when a user terminal receives a plurality of counter DAIS with different numbers of bits is described (including decision of counter DAI, decision of codebook size, etc.).

<FDD>

As described above, in FDD, it is assumed that the DL assignment that the user terminal receives via the common search space is configured not to include the counter DAI. Therefore, when the radio base station schedules the PDSCH of the primary cell (PCell) with the DL assignment of the common search space, the user terminal detects a DL assignment not including the counter DAI.

Also, with the DL assignment of the common search space, only the PCell PDSCH can be scheduled, and this is equivalent to the value of counter DAI being 1. Therefore, in FDD, when the PDSCH (for example, UE-specific PDSCH) is scheduled to the user terminal by DL assignment not including counter DAI, the user terminal can feedback the HARQ-ACK on the assumption that the value of the counter DAI is 1.

Also, in FDD, it is assumed that the UL grant received by the user terminal in the common search space is configured not to include the UL DAI. Therefore, when the radio base station schedules PCell's PUSCH with UL grant in the common search space, the user terminal detects the UL grant not including the UL DAI.

When a PUSCH (for example, UE-specific PUSCH) is scheduled to the user terminal by UL grant without UL DAI, the user terminal cannot determine the codebook size based on the UL DAI. Therefore, the user terminal can be configured to determine the HARQ-ACK codebook size based on other conditions.

For example, the user terminal can determine the codebook size based on the maximum value of the counter DAI included in the PDSCH-scheduling DL assignment corresponding to the HARQ-ACK. After the codebook size is determined, the user terminal can transmit the HARQ-ACK on the PUSCH designated by the UL grant. According to this configuration, even in the PUSCH scheduled by the UL grant of the common search space, it is possible to dynamically control the HARQ-ACK codebook size.

Alternatively, the user terminal may be configured to feed back HARQ-ACK for all CCs configured for that user terminal. That is, the user terminal feeds back the HARQ-ACK using the maximum HARQ-ACK codebook size based on the number of configured CCs. This is similar to the HARQ-ACK feedback method of the existing CA system. According to this configuration, when the PUSCH is scheduled by the UL grant of the common search space, the HARQ-ACK codebook is semi-static, so that the base station can receive the HARQ-ACK with a simple configuration (without performing decoding assuming a plurality of different codebook sizes).

Alternatively, the user terminal can be configured to feed back only the PCell HARQ-ACK. That is, regardless of the number of CCs configured, the user terminal feeds back the HARQ-ACK using the smallest HARQ-ACK codebook size. This is similar to the HARQ-ACK feedback method of the existing non-CA system. According to this configuration, when the PUSCH is scheduled by the UL grant of the common search space, HARQ-ACK overhead can be minimized, so that it is possible to flexibly control the amount of resources allocated to PUSCH, and, in addition, the radio base station can receive the HARQ-ACK with a simple configuration (without performing decoding assuming a plurality of different codebook sizes).

Alternatively, in the same subframe, if PUSCH is scheduled by a UL grant containing even one UL DAI, the user terminal can determine the HARQ-ACK codebook size at least based on the UL DAI. According to this configuration, when UL DAI is detected in any UL grant, the user terminal determines the HARQ-ACK codebook size based on the UL DAI, the codebook size of HARQ-ACK can be dynamically controlled also in PUSCH scheduled with UL grant of common search space.

<TDD>

As described above, in TDD, it is envisaged that the DL assignment/UL grant transmitted at least in the common search space is configured to include a 2-bit counter DAI. Therefore, when the radio base station schedules the PDSCH/PUSCH of the primary cell (PCell) with the DL assignment/UL grant of the common search space, the user terminal detects a DL assignment/UL grant including a 2-bit DAI.

Also assume a case where scheduling is performed by PCell's common search space DL assignment/UL grant and SCell's DL Assignment/UL Grant (for example, UE-specific search space). In such a case, the user terminal may detect a DL assignment/UL grant including DAI with different number of bits.

Therefore, in TDD, if only a 2-bit counter DAI (DL DAI) is included in the PDSCH-scheduling DL assignment, the user terminal can determine the HARQ-ACK codebook size as in the non-CA case.

Also, in TDD, when a 2-bit counter DAI and a 3-bit to 5-bit counter DAI are included in the PDSCH-scheduling DL assignment, the user terminal can determine the HARQ-ACK codebook size based on the 3-bit to 5-bit counter DAI.

In this way, the size of the court book or the like is determined based on the above-mentioned conditions taking into account the counter DAIS included in the DL assignment received by the user terminal, so that the user terminal can appropriately interpret the received counter DAIS, and the user terminal can appropriately feed back the HARQ-ACKs.

Third Example

In a third example, a method of selecting an uplink control channel format (PUCCH format) to be applied to HARQ-ACK transmission by a user terminal will be described.

In the LTE system after Rel. 13, the capacity of uplink control information (for example, HARQ-ACK, scheduling request (SR), channel state information (CSI)) transmitted by the user terminal also increases with the expansion of the number of CCs. Therefore, it is planned that a plurality of PUCCH formats (for example, HARQ-ACK) (for example, PF 3 to 5) are supported as PUCCH formats that can be used for transmission of uplink control information.

Further, it is assumed that the user terminal controls the UL transmission by selecting a predetermined PUCCH format based on the number of bits required for transmission of uplink control information. For example, in HARQ-ACK transmission, it may be possible that the user terminal switches and uses the PUCCH format according to the HARQ-ACK codebook size determined based on the counter DAI.

However, if the user terminal cannot receive the DL assignment for the PDSCH of the CC with the largest counter DAI value, the user terminal may transmit the HARQ-ACK with a codebook size different from the HARQ-ACK codebook size assumed by the radio base station. Also, when using a configuration that switches the PUCCH format according to the codebook size, the user terminal may transmit the HARQ-ACK in a PUCCH format different from the PUCCH format assumed by the radio base station. If the user terminal cannot properly decide the PUCCH format to use for HARQ-ACK transmission, it becomes difficult to flexibly control the PUCCH resources at the radio base station.

FIG. 5 shows an example of the case where the counter DAI and the ARI indicating the resource of the PUCCH are included in the downlink control information (DL assignment) and are reported from the radio base station to the user terminal. FIG. 5A shows a table in which predetermined ARI bit values and different PUCCH resources used in different PUCCH formats respectively are defined in association with each other. Based on the number of scheduled CCs, the radio base station configures the PUCCH resource (ARI) on the assumption that HARQ-ACKs are fed back from the user terminal using a predetermined PUCCH format.

Further, in the case shown in FIG. 5B, the radio base station schedules DL transmission in one subframe, in 15 CCs out of the 20 CCs configured in the user terminal. FIG. 5C shows the number of CCs that the user terminal receives (five in this case), compared to the number of CCs scheduled in FIG. 5B.

As shown in FIG. 5B, the radio base station schedules DL transmission in 15 CCs. A predetermined number or more of bits are required for HARQ-ACK transmission for 15 CCs, so that the radio base station assumes that the user terminal applies a PUCCH format (PF 4 or PF 5) having large capacity, and, the radio base station reports a predetermined PUCCH resource to the user terminal using the ARI (here, ARI=1/resource X).

On the other hand, as shown in FIG. 5C, assume that the user terminal cannot receive the DL assignments of some CCs (for example, counter DAI=6 to 14). In this case, the user terminal determines the codebook size based on the received maximum counter DAI value (here, the counter DAI=5), and selects the PUCCH format (PF 3 in this case) to use for HARQ-ACK transmission. In addition, the user terminal multiplexes the HARQ-ACK to the PUCCH resource of PF 3 (resource B) based on the ARI value (here, ARI=1).

In this way, when a reception failure occurs in the user terminal, in some cases, the user terminal transmits the HARQ-ACK using a PUCCH format different from the PUCCH format (PUCCH resource) assumed by the radio base station. In consideration of such a problem, when performing control to avoid collision with another user terminal, the radio base station cannot allocate resource B as well as resource B to other user terminals. As a result, the utilization efficiency of PUCCH resources may decrease.

Therefore, in the present embodiment, information indicating a predetermined PUCCH format (PUCCH format indicator, PF indicator, etc.) is included in the DL signal-scheduling DL assignment (for example, PDSCH) and reported to the user terminal. Regardless of the counter DAI (or the number of CCs received), the user terminal can select a predetermined PUCCH format based on the PUCCH format information included in the DL assignment.

For example, the PUCCH format information (PUCCH format indicator) may be information indicating one of the PUCCH format 3 or PUCCH format 4/5. In this case, the PUCCH format indicator can be comprised of 1 bit. The PUCCH format and the number of bits that can be specified by the PUCCH format indicator are not limited to this.

Also, the PUCCH format indicator (for example, 1 bit) can be configured to be included in a given DL assignment. For example, the PUCCH format indicator may be configured to be added to the DL assignment A DL assignment for a user terminal that may transmit HARQ-ACK/SR of 23 bits or more. Alternatively, the PUCCH format indicator may be configured to be added to the DL assignment for user terminal where PUCCH format 4/5 PUCCH resource is configured.

Figure 6:
FIG. 6 is a diagram to explain PUCCH resource selection based on PUCCH format indicator and ARI in the third example.

Regardless of the number of bits of the HARQ-ACK, the user terminal transmits the HARQ-ACK using the PUCCH format specified by the PUCCH format indicator. In addition, the user terminal may determine the HARQ-ACK codebook size based on the value of the counter DAI. Further, the user terminal may decide the PUCCH resource based on the PUCCH format specified by the PUCCH format indicator and the bit information designated by the ARI (see FIG. 6).

FIG. 7 shows a case where the counter DAI, the ARI indicating the resource of the PUCCH, and the PUCCH format indicator indicating the predetermined PUCCH format are included in the downlink control information (DL assignment) and are reported from the radio base station to the user terminal. FIG. 7A shows a table in which a PUCCH format to be selected based on a bit value of a PUCCH format indicator (here, one bit) is defined.

Further, in the case shown in FIG. 7B, in one subframe, the radio base station schedules DL transmission in 15 CCs out of the 20 CCs configured in the user terminal. FIG. 7C shows the number of CCs that the user terminal receives (five in this case) compared to the number of CCs scheduled in FIG. 7B.

As shown in FIG. 7B, the radio base station schedules DL transmission in 15 CCs. A predetermined number or more of bits are required for HARQ-ACK transmission for 15 CCs, the radio base station assumes that the user terminal applies a PUCCH format (PF 4 or PF 5) having large capacity. Therefore, the radio base station reports PUCCH format indicator ("1") specifying PF 4/5 in DL assignment and predetermined PUCCH resource (in this case, ARI=1/resource X) used in the PF 4/5 to the user terminal.

As shown in FIG. 7C, it is assumed that the user terminal cannot receive the DL assignments of some CCs (for example, counter DAI=6 to 14). In this case, the user terminal selects the PUCCH format (here PF 4/5) indicated by the PUCCH format indicator ("1") regardless of the number of CCs received (or the value of the counter DAI). Based on the value of ARI (here, ARI=1), the user terminal multiplexes the HARQ-ACK on the PUCCH resource of PF 4/5 (resource X) (see FIG. 6). In addition, the user terminal can determine the HARQ-ACK codebook size based on the received maximum counter DAI value (here, 5).

In this way, the PUCCH format indicator is included in the DL assignment and reported to the user terminal, so that it is possible to match the recognition of the PUCCH format between the radio base station and the user terminal even when a detection failure occurs in the user terminal. Thus, the radio base station can flexibly control the allocation of PUCCH resources to each user terminal, and improve the utilization efficiency of PUCCH resources.

In FIGS. 7B and 7C, an example in which the PUCCH format indicator is also included in the PDSCH-scheduling DL assignment of the PCell has been described, but the PUCCH format indicator may be included only in the SCell's PDSCH-scheduling DL assignment (that is, DL assignment including ARI).

When using a configuration in which the PUCCH format indicator is not included in the PDSCH-scheduling DL assignment of PCell, if only the DL assignment is received, the user terminal can transmit HARQ-ACK in PUCCH format 1a/1b. As a result, it is possible to suppress an increase in overhead of the PCell PDSCH-scheduling DL assignment.

(Radio Communication System)

Now, the structure of the radio communication system according to an embodiment of the present invention will be described below. In this radio communication system, the radio communication methods of the above-described embodiments are employed. Note that the radio communication methods of the above-described embodiments may be applied individually or may be applied in combination.

Figure 8:
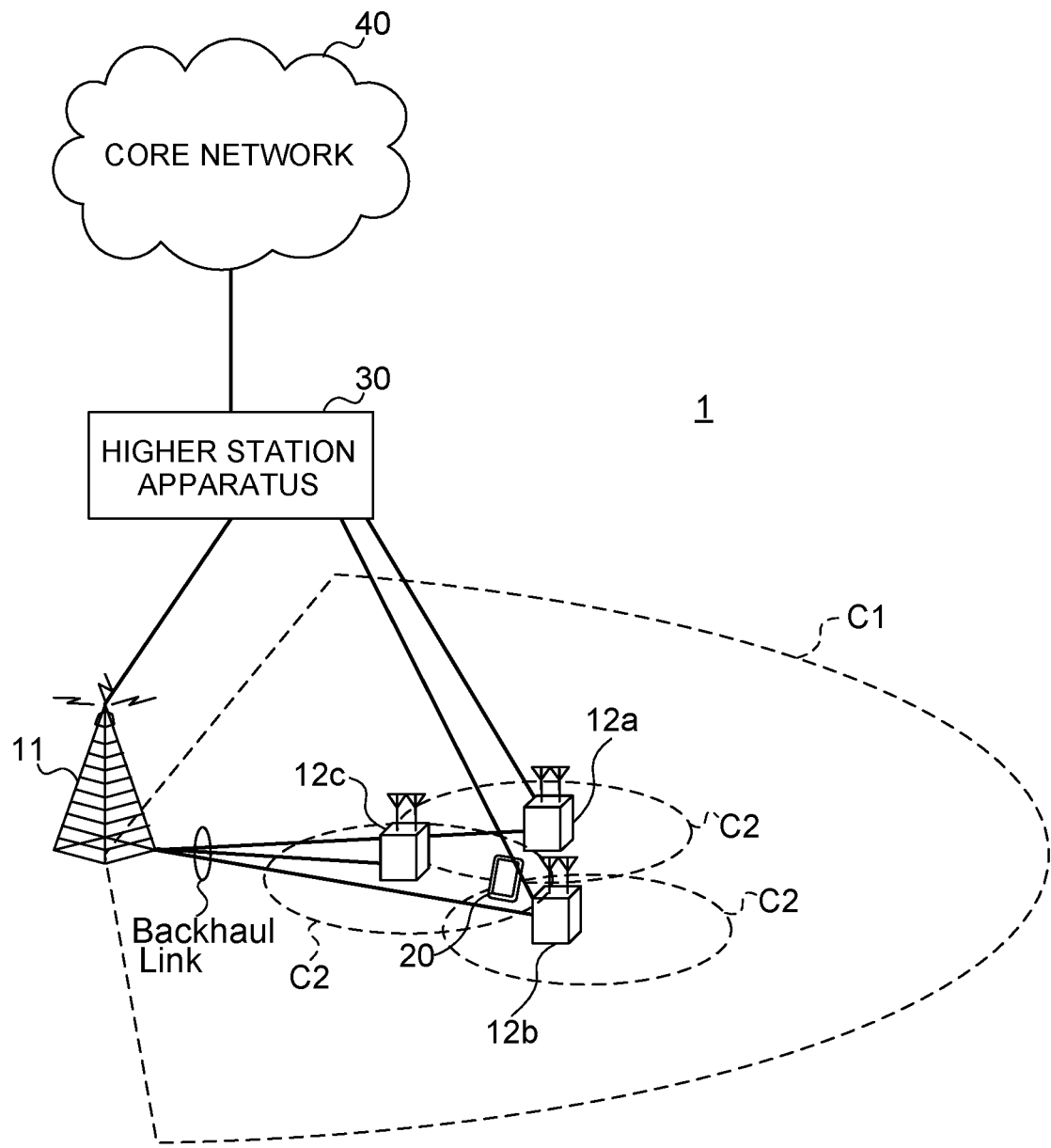
FIG. 8 is a diagram to show a schematic structure of a radio communication system according to an embodiment of the present invention.

FIG. 8 is a diagram to show an example of a schematic structure of a radio communication system according to an embodiment of the present invention. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 shown in FIG. 8 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and OFDMA may be used in the uplink.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Blocks) is communicated in the PBCH.

The downlink L1/L2 control channels include downlink control channels (the PDCCH (Physical Downlink Control CHannel) and/or the EPDCCH (Enhanced Physical Downlink Control Channel)), the PCFICH (Physical Control Format Indicator CHannel), the PHICH (Physical Hybrid-ARQ Indicator CHannel) and so on. Downlink control information (DCI) including PDSCH and PUSCH scheduling information is communicated by the PDCCH. The number of OFDM symbols for use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Uplink control information (UCI: Uplink Control Information), including at least one of delivery acknowledgment information (ACK/NACK) and radio quality information (CQI), is transmitted by the PUSCH or the PUCCH. By means of the PRACH, random access preambles for establishing connections with cells are communicated.

<Radio Base Station>

Figure 9:
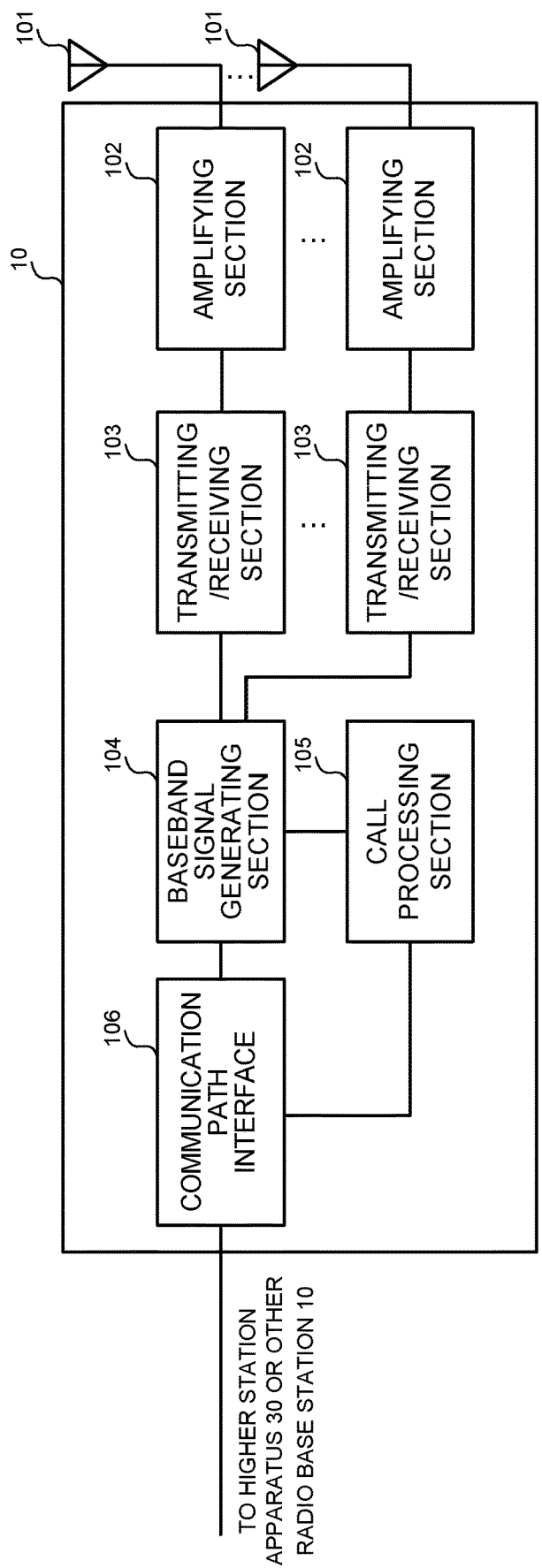
FIG. 9 is a diagram to show an example of an overall structure of a radio base station according to an embodiment of the present invention.

FIG. 9 is a diagram to show an example of an overall structure of a radio base station according to an embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections (transmission section) 103 can perform DL transmission from a plurality of CCs, and, furthermore, transmit predetermined downlink control information including a counter DAI of 3 bits or more. In addition, the transmitting/receiving sections (receiving section) 103 receive HARQ-ACKs fed back from the user terminal for the DL transmission. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (backhaul signaling) with other radio base stations 10 via an inter-base station interface (for example, an interface in compliance with the CPRI (Common Public Radio Interface), such as optical fiber, the X2 interface, etc.).

Figure 10:
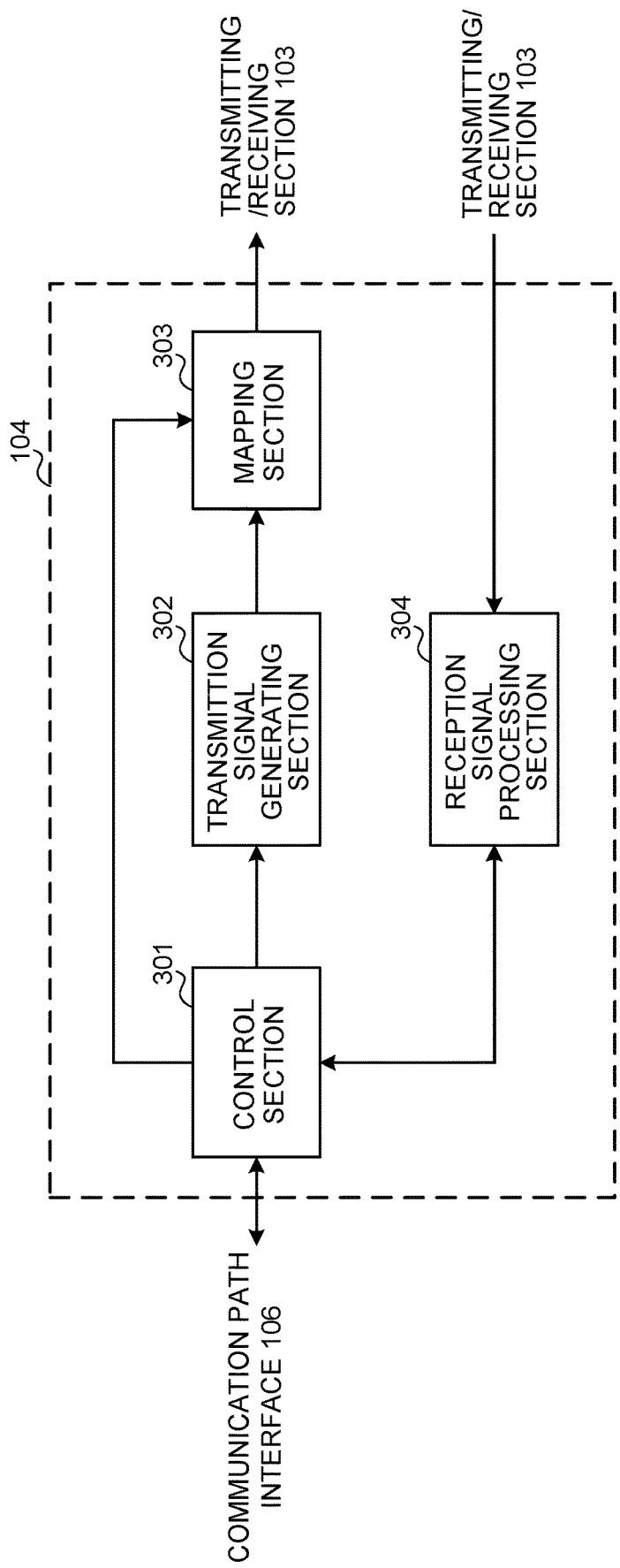
FIG. 10 is a diagram to show an example of a functional structure of a radio base station according to an embodiment of the present invention.

FIG. 10 is a diagram to show an example of a functional structure of a radio base station according to the present embodiment. Note that, although FIG. 10 primarily shows functional blocks that pertain to characteristic parts of the present embodiment, the radio base station 10 has other functional blocks that are necessary for radio communication as well. As shown in FIG. 10, the baseband signal processing section 104 has a control section (scheduler) 301, a transmission signal generation section (generating section) 302, a mapping section 303 and a received signal processing section 304.

The control section (scheduler) 301 controls the scheduling (for example, resource allocation) of downlink data signals that are transmitted in the PDSCH and downlink control signals that are communicated in the PDCCH and/or the EPDCCH. Also, the control section 301 controls the scheduling of system information, synchronization signals, paging information, CRSs (Cell-specific Reference Signals), CSI-RSs (Channel State Information Reference Signals) and so on. Furthermore, the control section 301 also controls the scheduling of uplink reference signals, uplink data signals that are transmitted in the PUSCH, and uplink control signals that are transmitted in the PUCCH and/or the PUSCH.

The control section 301 controls the retransmission of downlink data/new data transmission based on delivery acknowledgment signals (HARQ-ACKs) fed back from the user terminals. Further, the control section 301 controls reception processing of HARQ-ACK fed back from the user terminal based on the bundling window in response to DL transmission. Note that the reception processing may be performed in the received signal processing section 304 based on commands from the control section 301. Note that, for the control section 301, a controller, a control circuit or a control device that can be described based on common understanding of the technical field to which the present invention pertains can be used.

The transmission signal generation section 302 generates DL signals (downlink control signals, downlink data signals, downlink reference signals and so on) based on commands from the control section 301, and outputs these signals to the mapping section 303. To be more specific, the transmission signal generation section 302 generates a downlink data signal (PDSCH) including user data, and outputs it to the mapping section 303. Further, the transmission signal generation section 302 generates a downlink control signal (PDCCH/EPDCCH) including DCI (UL grant), and outputs it to the mapping section 303. Further, the transmission signal generation section 302 generates downlink reference signals such as CRS and CSI-RS, and outputs them to the mapping section 303. For the transmission signal generation section 302, a signal generator, a signal generating circuit or a signal generating device that can be described based on common understanding of the technical field to which the present invention pertains can be used.

The mapping section 303 maps the downlink signals generated in the transmission signal generation section 302 to predetermined radio resources based on commands from the control section 301, and outputs these to the transmitting/receiving sections 103. For the mapping section 303, mapper, a mapping circuit or a mapping device that can be described based on common understanding of the technical field to which the present invention pertains can be used.

The received signal processing section 304 performs the reception process (for example, demapping, demodulation, decoding, etc.) of the UL signals (HARQ-ACK, PUSCH, etc.) transmitted from the user terminal 20. The processing results are output to the control section 301. The receiving process section 304 can be constituted by a signal processor, a signal processing circuit or a signal processing device, and a measurer, a measurement circuit or a measurement device that can be described based on common understanding of the technical field to which the present invention pertains.

<User Terminal>

Figure 11:
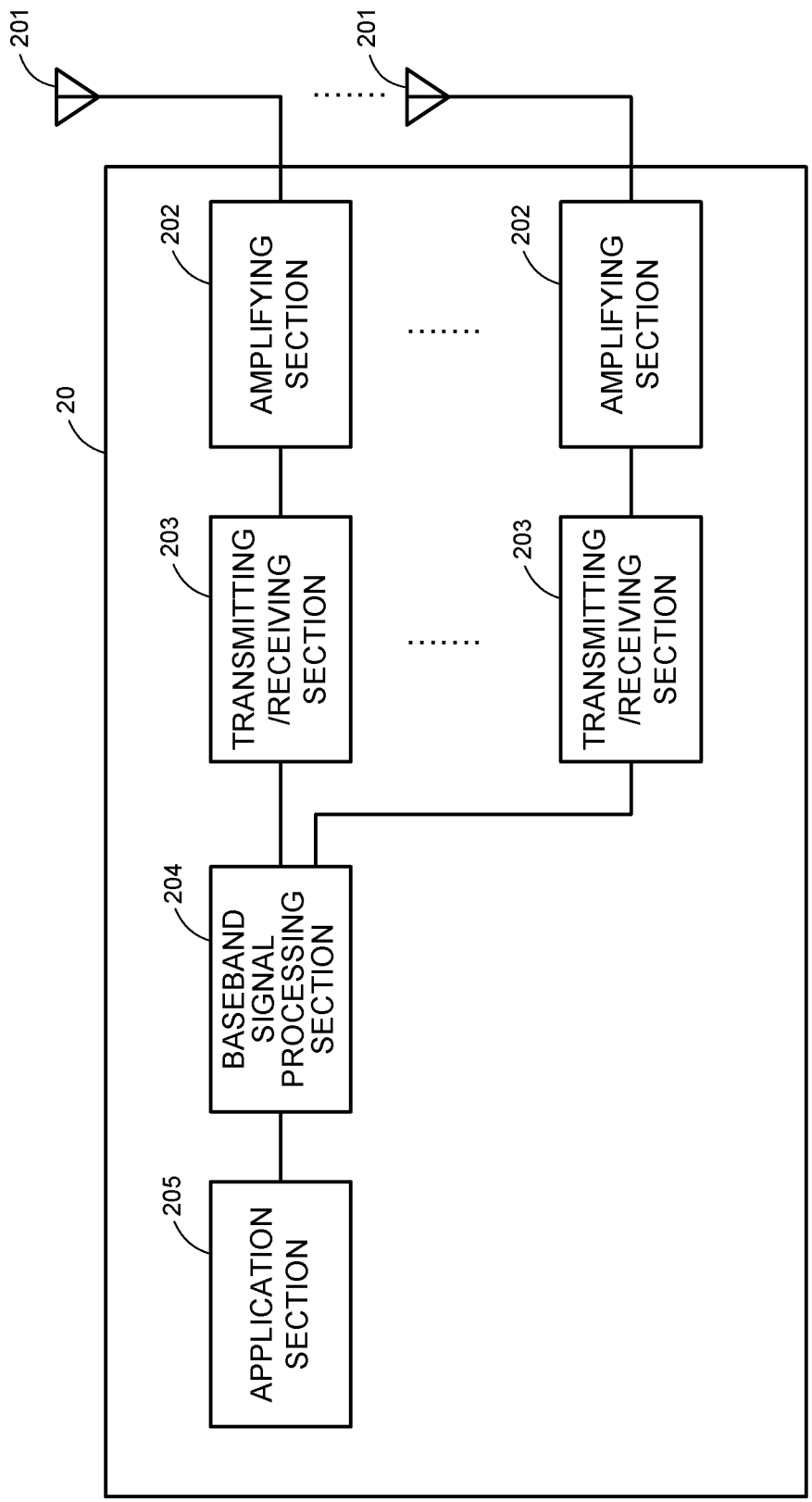
FIG. 11 is a diagram to show an example of an overall structure of a user terminal according to an embodiment of the present invention.

FIG. 11 is a diagram to show an example of an overall structure of a user terminal according to an embodiment of the present invention. A user terminal has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving sections 203, and output to the baseband signal processing section 204.

The transmitting/receiving section (receiving section) 203 receives DL signals transmitted from a plurality of component carriers (CCs). In addition, the transmitting/receiving section (receiving section) 203 can receive the counter DAI configured with bits of 3 bits or more via predetermined downlink control information. Note that, for the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 12:
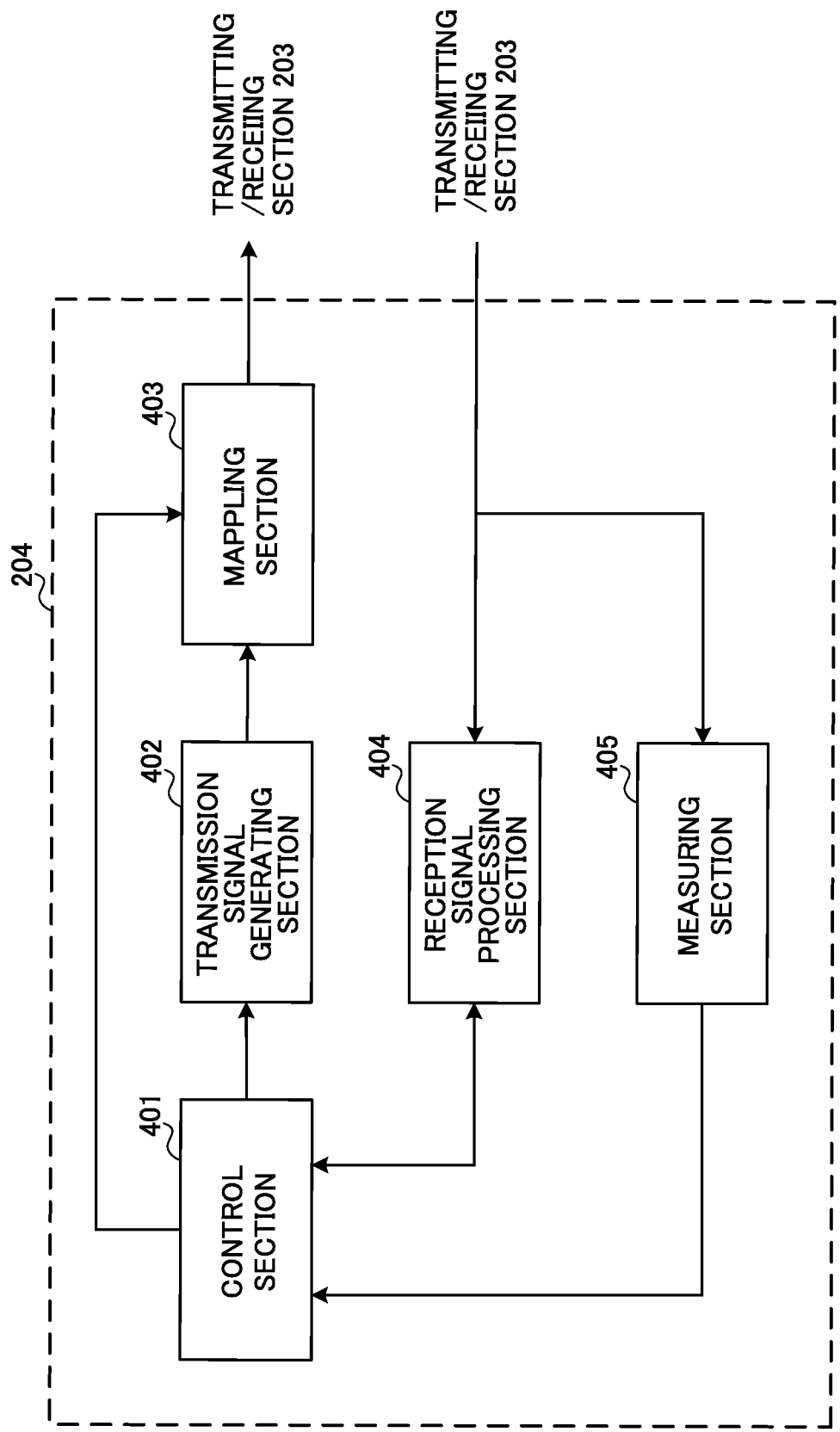
FIG. 12 is a diagram to show an example of a functional structure of a user terminal according to an embodiment of the present invention.

FIG. 12 is a diagram to show an example of a functional structure of a user terminal according to the present embodiment. Note that, although FIG. 12 primarily shows functional blocks that pertain to characteristic parts of the present embodiment, the user terminal 20 has other functional blocks that are necessary for radio communication as well. As shown in FIG. 12, the baseband signal processing section 204 provided in the user terminal 20 has a control section 401, a transmission signal generation section 402, a mapping section 403, a received signal processing section 404 and a decision section 405.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on. To be more specific, the control section 401 can control the transmission signal generation section 402, the mapping section 403 and the received signal processing section 404.

The control section 401 controls the transmission of an HARQ-ACK in response to a received DL signal based on a counter DAI included in the downlink control information. Also, the counter DAI can be comprised of different number of bits based on the number of CCs configured in the user terminal and the number of CCs where listening is applied to DL transmission (see FIG. 4). Further, the counter DAI can be comprised of different numbers of bits depending on the type of CC where the downlink shared channel scheduled by downlink control information including the counter DAI is transmitted (received). Further, the counter DAI can be comprised of different numbers of bits, depending on the type of CC to which downlink control information including the counter DAI is transmitted (received).

Further, when the downlink shared channel is scheduled by the downlink control information not including the counter DAI, the control section 401 can control the HARQ-ACK transmission for the downlink shared channel on the assumption that the counter DAI is a predetermined value.

In addition, when an uplink shared channel is scheduled by a UL grant not including UL DAI, the control section 401 can multiplex the HARQ-ACK on the uplink shared channel, and determine the HARQ-ACK codebook size based on the maximum counter DAI value of the downlink control information that schedules the downlink shared channel corresponding to the HARQ-ACK.

Also, when the number of counter DAI bits included in a plurality of downlink control information received from each CC is different, the control section 401 can control the HARQ-ACK transmission based on the counter DAI having the largest number of bits. Also, based on information indicating a predetermined uplink control channel format included in the downlink control information, the control section 401 can determine the uplink control channel format to be applied to the HARQ-ACK transmission (see FIGS. 6 and 7). Note that the total DAI can be information that explicitly indicates one bit value. For the control section 401, a controller, a control circuit or a control device that can be described based on common understanding of the technical field to which the present invention pertains can be used.

The transmission signal generation section 402 generates UL signals based on commands from the control section 401, and outputs these signals to the mapping section 403. For example, the transmission signal generation section 402 generates uplink control signals such as delivery acknowledgement signals (HARQ-ACKs), channel state information (CSI) and so on, based on commands from the control section 401.

Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal. For the transmission signal generation section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generation section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of DL signals (for example, downlink control signals transmitted from the radio base station, downlink data signals transmitted in the PDSCH, and so on). The received signal processing section 404 outputs the information received from the radio base station 10, to the control section 401 and the decision section 405. The received signal processing section 404 outputs, for example, broadcast information, system information, RRC signaling, DCI and so on, to the control section 401.

The received signal processing section 404 can be constituted by a signal processor, a signal processing circuit or a signal processing device, and a measurer, a measurement circuit or a measurement device that can be described based on common understanding of the technical field to which the present invention pertains. Also, the received signal processing section 404 can constitute the receiving section according to the present invention.

The decision section 405 makes retransmission control decisions (ACKs/NACKs) based on the decoding results in the receiving process section 404, and, furthermore, outputs the results to the control section 401. When downlink signals (PDSCH) are transmitted from multiple CCs (for example, six or more CCs), retransmission control decisions (ACKs/NACKs) are made on a per CC basis, and output to the control section 401. For the decision section 405, a decision maker, a decision making circuit or a decision making device that can be described based on common understanding of the technical field to which the present invention pertains can be used.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with one physically-integrated device, or may be implemented by connecting two physically-separate devices via radio or wire and using these multiple devices.

Figure 13:
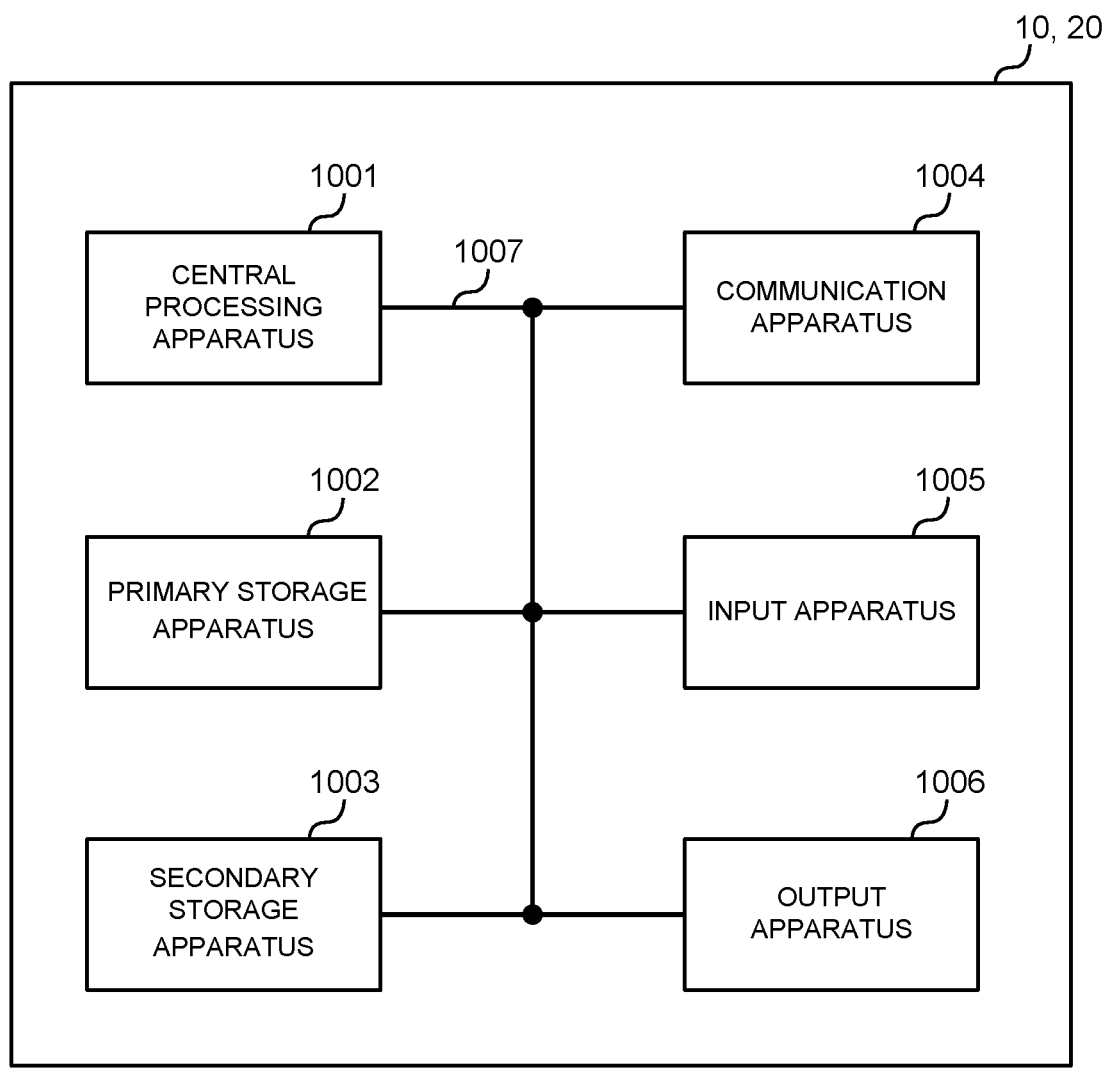
FIG. 13 is a diagram to show an example hardware structure of a radio base station and a user terminal according to an embodiment of the present invention.

That is, a radio base station, a user terminal and so on according to an embodiment of the present invention may function as a computer that executes the processes of the radio communication method of the present invention. FIG. 13 is a diagram to show an example hardware structure of a radio base station and a user terminal according to an embodiment of the present invention. Physically, a radio base station 10 and a user terminal 20, which have been described above, may be formed as a computer apparatus that includes a central processing apparatus (processor) 1001, a primary storage apparatus (memory) 1002, a secondary storage apparatus 1003, a communication apparatus 1004, an input apparatus 1005, an output apparatus 1006 and a bus 1007. Note that, in the following description, the word "apparatus" may be replaced by "circuit," "device," "unit" and so on.

Each function of the radio base station 10 and user terminal 20 is implemented by reading predetermined software (programs) on hardware such as the central processing apparatus 1001, the primary storage apparatus 1002 and so on, and controlling the calculations in the central processing apparatus 1001, the communication in the communication apparatus 1004, and the reading and/or writing of data in the primary storage apparatus 1002 and the secondary storage apparatus 1003.

The central processing apparatus 1001 may control the whole computer by, for example, running an operating system. The central processing apparatus 1001 may be formed with a processor (CPU: Central Processing Unit) that includes a control apparatus, a calculation apparatus, a register, interfaces with peripheral apparatus, and so on. For example, the above-described baseband signal process section 104 (204), call processing section 105 and so on may be implemented by the central processing apparatus 1001.

Also, the central processing apparatus 1001 reads programs, software modules, data and so on from the secondary storage apparatus 1003 and/or the communication apparatus 1004, into the primary storage apparatus 1002, and executes various processes in accordance with these. As for the programs, programs to allow the computer to execute at least part of the operations of the above-described embodiments may be used. For example, the control section 401 of the user terminal 20 may be stored in the primary storage apparatus 1002 and implemented by a control program that runs on the central processing apparatus 1001, and other functional blocks may be implemented likewise.

The primary storage apparatus (memory) 1002 is a computer-readable recording medium, and may be constituted by, for example, at least one of a ROM (Read Only Memory), an EPROM (Erasable Programmable ROM), a RAM (Random Access Memory) and so on. The secondary storage apparatus 1003 is a computer-readable recording medium, and may be constituted by, for example, at least one of a flexible disk, an opto-magnetic disk, a CD-ROM (Compact Disc ROM), a hard disk drive and so on.

The communication apparatus 1004 is hardware (transmitting/receiving device) for allowing inter-computer communication by using wired and/or wireless networks, and may be referred to as, for example, a "network device," a "network controller," a "network card," a "communication module" and so on.

For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for allowing sending output to the outside (for example, a display, a speaker, etc.). Note that the input apparatus 1005 and the output apparatus 1006 may be provided in an integrated structure (for example, a touch panel).

Also, the apparatuses, including the central processing apparatus 1001, the primary storage apparatus 1002 and so on, may be connected via a bus 1007 to communicate information with each other. The bus 1007 may be formed with a single bus, or may be formed with buses that vary between the apparatuses. Note that the hardware structure of the radio base station 10 and the user terminal 20 may be designed to include one or more of each apparatus shown in the drawings, or may be designed not to include part of the apparatuses.

For example, the radio base station 10 and the user terminal 20 may be structured to include hardware such as an ASIC (Application-Specific Integrated Circuit), a PLD (Programmable Logic Device), an FPGA (Field Programmable Gate Array) and so on, and part or all of the functional blocks may be implemented by the hardware.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "cells," "frequency carriers," "carrier frequencies" and so on.

Also, the information and parameters described in this description may be represented in absolute values or in relative values with respect to a predetermined value, or may be represented in other information formats. For example, radio resources may be specified by predetermined indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

Also, software and commands may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

The examples/embodiments illustrated in this description may be used individually or in combinations, and may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (MIBs (Master Information Blocks) and SIBs (System Information Blocks)) and MAC (Medium Access Control) signaling and so on), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2015-217988, filed on Nov. 5, 2015, including the specification, drawings and abstract, is incorporated herein by reference in its entirety.

The invention claimed is:

1. A terminal comprising:
a receiver that receives downlink (DL) signals transmitted in a plurality of cells; and
a processor that determines an uplink control channel (PUCCH) resource used for Hybrid Automatic Repeat reQuest Acknowledgement (HARQ-ACK) transmission in response to the DL signals, by using table information related to PUCCH resources and a resource indicator value included in downlink control information,
wherein the table information shows a plurality of resource indicator values,
wherein each resource indicator value corresponds to a plurality of combinations of a PUCCH resource and a PUCCH format, and
wherein, for each resource indicator value, the plurality of combinations have different PUCCH formats.

2. A radio communication method for a terminal, comprising:
receiving downlink (DL) signals transmitted in a plurality of cells; and
determining an uplink control channel (PUCCH) resource used for Hybrid Automatic Repeat reQuest Acknowledgement (HARQ-ACK) transmission in response to the DL signals, by using table information related to PUCCH resources and a resource indicator value included in downlink control information,
wherein the table information shows a plurality of resource indicator values,
wherein each resource indicator value corresponds to a plurality of combinations of a PUCCH resource and a PUCCH format, and
wherein, for each resource indicator value, the plurality of combinations have different PUCCH formats.

* * * * *